Nov. 2, 1926.
1,605,131
H. J. MINDERMANN
VIEW OBSCURING SHUTTER FOR VEHICLES
Filed August 14, 1925
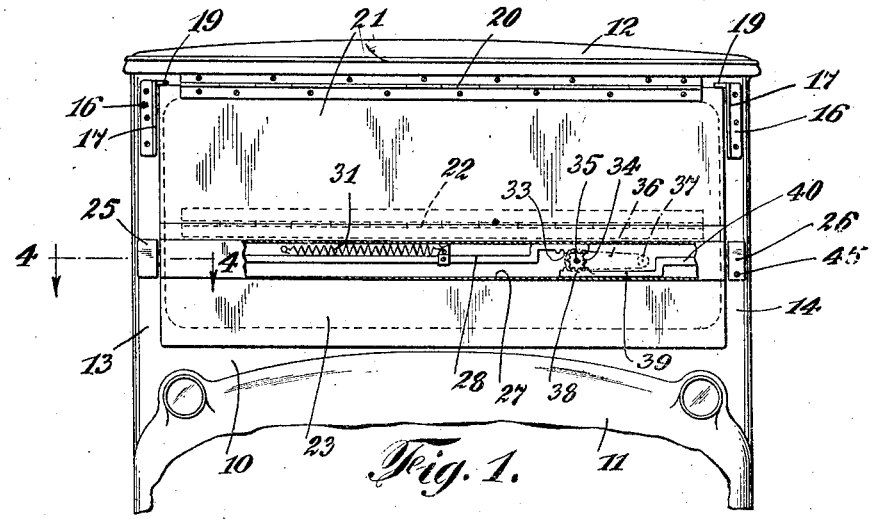
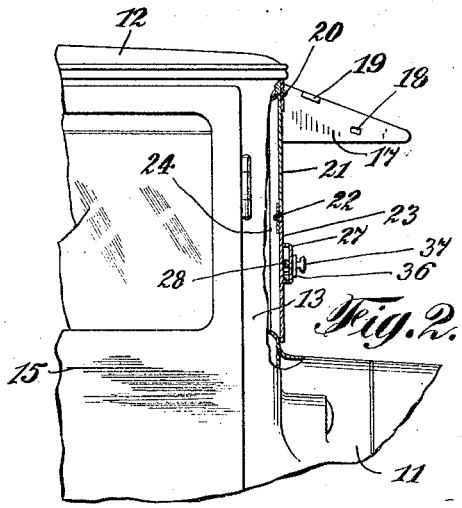
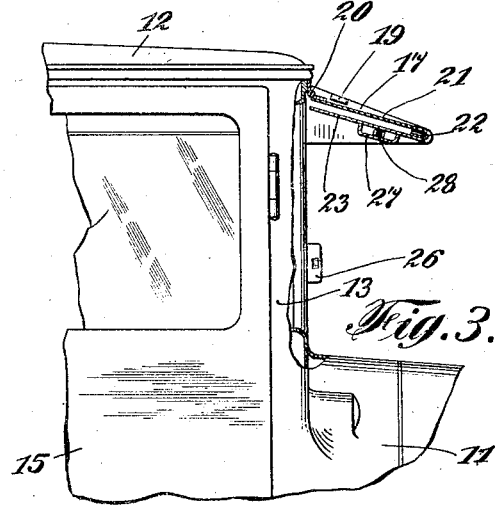
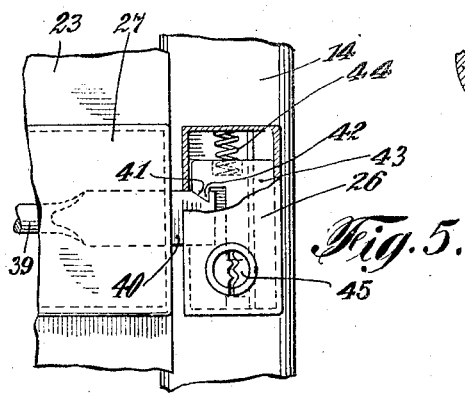
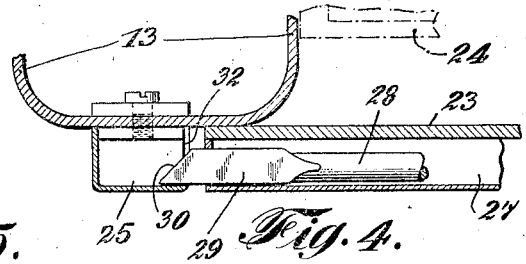
INVENTOR
Henry J. Mindermann
BY
Charles L. Wright.
his ATTORNEY Patented Nov. 2, 1926.

1,605,131

UNITED STATES PATENT OFFICE.

HENRY J. MINDERMANN, OF WEST HOBOKEN, NEW JERSEY.

VIEW-OBSCURING SHUTTER FOR VEHICLES.

Application filed August 14, 1925. Serial No. 50,185.

This invention relates to devices for discouraging unauthorized use of vehicles of the automobile type, and is an improvement over my former Patent No. 1,550,917, issued Aug. 25, 1925.

One of the objects of the invention is to provide an opaque shutter or shield of the type designated, that can be actuated in such manner as to completely obscure vision through the front of a car, rendering driving impracticable.

A further feature is in the provision of key controlling means by which the sections of the shutter may be raised, lowered or extended at an angle and securely locked or released at will.

Another aim is to produce an effective and practical shutter capable of being raised or folded to admit air and light to the interior of a car and visibility therethrough, but act to prevent entrance of direct rays of light from the sun.

These and other important features are achieved by the novel construction and arrangement of parts hereinafter disclosed and illustrated in the accompanying drawing, forming a material part of this disclosure and in which:—

Figure 1 is a front elevational view of a conventional type of car, showing the application of an embodiment of the invention, parts being broken away to disclose the structure.

Figure 2 is a partial side elevational view of the same, the shutter being in section and shown in an operative position.

Figure 3 is a similar view of the same with the shutter in a raised and folded position.

Figure 4 is an enlarged fragmentary sectional view taken on line 4—4 of Figure 1.

Figure 5 is an enlarged fragmentary side view showing the locking device, and broken away to disclose the interior.

In the illustrations the numeral 10 designates in general the front of an automobile over the motor casing 11, above which is a roof 12, supported by corner posts 13 and 14 to which the doors 15 are hinged.

These posts are hollow, as shown in Figures 2, 3 and 4 and blend into the fixed portion of the motor casing to constitute an ornamental frame, the foregoing being in all respects descriptive of the usual construction and form no part of the present invention.

Securely attached to the front of the posts, at their upper ends, are the flanged feet 16 of forwardly extending plate brackets 17, generally triangular in profile, their horizontal edges being disposed downwardly.

Formed through the brackets 17, near their lower edges, are openings 18 and fixed on their upper edges are rigid stops 19, the purpose of these elements being further on apparent.

A long hinge 20, of the piano type, extends nearly from side to side of the car, one of its leaves being fixed to the frame at the front, adjacent the roof 12, the other leaf being secured to the upper marginal edge of an opaque plate 21, an oblong rectangle in contour, this plate being connected at its lower edge, by a similar hinge 22, with a similar but narrower plate 23.

These plates when hanging freely pendant constitute a metal shutter or curtain, completely covering the face of the usual transparent wind shield 24, preventing vision therethrough.

In order to lock and positively secure the plates 21 and 23, when in such position, a pair of hollow brackets 25 and 26 are fixed on the face of the posts 13 and 14 respectively, the same being disposed in a horizontal plane below the junction of the plates, and in line with a hollow rectangular bar 27 fixed on the plate 23 below the hinge 22.

Slidable in the bar is a bolt rod 28, its outer portion 29 being shaped rectangularly to be guided in its movements through the end wall of the hollow bar and having a bevelled end 30 adapted to contact with the corner of the bracket 25, causing the rod to move inwardly against the tension of a coiled spring 31, until the plate 23, contacts with the face of the post 13, at which time the end of the rod will enter an opening 32 in the bracket 25 and become engaged against its outer wall by the pull of the spring.

The opposite, inner end of the rod 28 is offset to slide against the adjacent wall of the hollow bar 27 and the inner side of the offset portion is provided with rack teeth 33 to engage a pinion 34, fixed on a stem 35, rotatable in the outer wall of the bar 27 and plate 23 respectively.

The stem 35 is fixed rigidly in a lever 36 provided with an outwardly extending knob 37, which upon being swung on the axis 35, obviously actuates the pinion and hence conveys lineal motion to the rod 28.

Another rack 38, formed on a rod 39, is movable against the opposite wall of the bar and is actuated by reason of its engagement with the opposite side of the pinion 34, but obviously moves in a direction opposed to that of the rod 28.

The outer portion 40, of the rod 39 is offset and shaped similarly to the opposite rod element 29, to engage the bracket 26, entering an opening therein, and its bevelled end is provided with a notch 41, adapted, when fully entered in the bracket, to receive a detent tooth 42, formed on a slide 43, movable vertically in the bracket and normally pressed down into engaging position by a coiled compression spring 44.

A lock 45, set in the bracket 26, provides means, by actuating a key therein, to raise the detent and release the rod 39 and consequently the rod 28.

When the shutter plates are released, by proper actuation of the lever 36, they may be folded upon the hinges 20—22 to assume the position shown in Fig. 3, at which time the rod elements 29 and 40 engage the openings 18 in the forwardly extending brackets 17 and are retained in such raised position until retracted by the knob actuated lever 36.

The stops 19 prevent unduly raising the plates, which assume a position to act as shields for the sun and rain in a desirable manner.

It is to be noted that the plates are so designed and proportioned with reference to fixed parts of the device as to be held out of contact with the same, thereby avoiding any noise such as would be ordinarily caused by rattling of the parts.

It is further pointed out that the shutter plates are automatically locked in either of their adjusted positions by actions of the spring 31, and that the movement of the lever 36 in releasing of the shutter is less than a quarter turn.

When the car is parked or temporarily not in use, the shutter is dropped, instantly becoming locked and held in a closed position, rendering it substantially impossible to use the car, or if an attempt be made, the condition is such as to attract immediate attention, leading to investigation and apprehension of the occupant.

From the foregoing it will be seen that a simple device for this purpose has been disclosed in the preferred form of its embodiment, but it is not desired to restrict the details to the exact construction shown, it being obvious that changes, not involving the exercise of the invention, may be made without conflicting with the scope of the appended claims.

Having thus described my invention, what I claim as new and desire to secure by Letters Patent, is:—

1. A view obscuring shutter for vehicles comprising an opaque plate hinged at its upper edge to extend over an opening in the front wall of a vehicle, a second plate hinged to the first plate to fold parallel therewith, brackets fixed on the vehicle adjacent the end edges of the lower plate, a pair of rack actuated rods mounted to slide horizontally in opposite directions on said lower plate, the outer ends of said rods being engageable in openings in said brackets when said plates are extended pendently, means for engaging the rod ends when the plates are folded, means for normally pressing the rods outwardly and a single means for retracting both rods simultaneously.

2. A view obscuring shutter for vehicles comprising an opaque plate hinged at its upper edge to extend over an opening in the front wall of a vehicle, a second plate hinged to the first plate to fold parallel therewith, brackets fixed on the vehicle adjacent the end edges of the lower plate, a hollow bar fixed on the lower plate in register with said brackets, opposed rack actuated rods slidable in said bar, said rods having bevelled extending ends to contact said brackets and enter in their inner sides, a tension spring in said bar to urge one of said rods outwardly, means co-incidently transmitting an outward movement to the other rod, means for locking said rods when engaged in their corresponding brackets, and key actuated means for releasing said locking means.

3. A view obscuring shutter for vehicles comprising an opaque plate hinged at its upper edge to extend over an opening in the front wall of a vehicle, a second plate hinged to the first plate to fold parallel therewith, brackets fixed on the vehicle adjacent the end edges of the lower plate, a hollow bar fixed on the lower plate in register with said brackets, opposed rods slidable in said bar, said rods having bevelled outwardly extending ends to contact the corners of said brackets and enter openings in their proximate sides, racks on the inner ends of said rods, said racks being in opposed relation, a pinion enmeshing both of said racks, a lever on which said pinion is fixed, means for manually actuating said lever, and a spring in said hollow bar acting to move said rods simultaneously.

4. A view obscuring shutter for vehicles comprising an opaque plate hinged at its upper edge to extend over an opening in the front wall of a vehicle, a second plate hinged to the first plate to fold parallel therewith, a pair of keeper brackets fixed on the vehicle adjacent the end edges of the lower plate, a pair of plate brackets extending outwardly from the front of the vehicle in vertical register with said keeper brackets, a pair of rack bolts carried horizontally by the lower plate to engage the keeper brackets when said plates are pendently extended, said bolts engaging openings in the plate brackets when folded upward therebetween, stops limiting the raise of said plates, a spring to move said rods oppositely outward into engaging position, means for positively preventing retraction of said bolts when engaged in said keeper brackets, key operated means for releasing said bolts, and hand operated means for retracting said bolts when released.

In testimony whereof I have signed my name to this application.

HENRY J. MINDERMANN.